Patented Mar. 8, 1932

1,848,772

UNITED STATES PATENT OFFICE

FRIEDRICH FELIX, OF BASEL, SWITZERLAND, ASSIGNOR TO SOCIETY OF CHEMICAL INDUSTRY IN BASLE, OF BASEL, SWITZERLAND

AZO-DYESTUFFS AND PROCESS OF MAKING SAME

No Drawing. Application filed October 16, 1929, Serial No. 400,169, and in Switzerland November 2, 1928.

The present invention relates to the manufacture of azo-dyestuffs which are valuable for, among other purposes, dyeing colloids of the cellulose series. It comprises the process of making these dyestuffs, the new dyestuffs, and the material dyed with the new dyestuffs.

According to the invention, dyestuffs which are specially suitable for coloring lacquers or varnishes or esters or ethers of cellulose, for instance Zapon varnish or acetate silk, are made by coupling diazotized esters of nucleally not sulfonated ortho-aminophenols with nucleally not sulfonated aromatic compounds which contain an R—H residue. (R standing for O or N—y, wherein y stands for the ω-methane sulfonic acid residue), and by treating the dyestuffs thus obtained with saponifying agents for the purpose of saponifying the ester and other saponifiable residues present, if any, and then, for the purpose of enhancing the fastness properties of the saponified dyestuffs, replacing the hydrogen atom of the above mentioned R—H residue by an aliphatic residue containing at the most three carbon atoms. This can be done by alkylation, for example with methyl chloride, ethyl bromide, ethylene chlorhydrine, epichlorhydrine, etc., or by acidylation, for example with formic acid, acetic anhydride, propionic acid chloride, and the like. By this operation the OH-group of the diazotizing component standing in ortho-position to the azo-bridge remains unchanged due to the azo-group apparently exercising a protective action.

Similar products are also obtained by choosing as coupling component compounds such as dialkylaniline, and then, after the coupling is complete, merely treating the reaction mixture with saponifying agents.

The dyestuffs thus obtained apparently correspond with the following general formula:

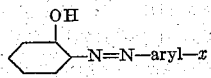

wherein $x$ is an OH- or an NH$_2$-group in which at least one of the hydrogen atoms is substituted by an alkyl residue or by an acidyl residue, both containing at most three carbon atoms. The dyestuffs are yellow to red powders and dye the aforesaid materials fast yellow to orange and red tints. They may be converted by treatment with agents yielding metals into metalliferous dyestuffs of which the dyeing tints may be essentially different from those of the dyestuffs not containing metal and having besides improved properties of fastness.

The following examples illustrate the invention, the parts being by weight:—

Example 1

263 parts of para-toluenesulfonic acid ester of ortho-aminophenol are diazotized and the diazo-compound thus obtained of the formula:

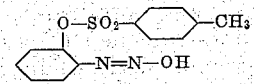

is introduced into a solution of 209 parts of sodium aniline-ω-methane-sulfonate containing 200 parts of sodium acetate. The dyestuff, which forms quickly, is filtered, suspended in 1000 parts of alcohol and the whole is boiled with 300 parts of caustic soda solution of 30 per cent. strength in a reflux apparatus for about ½ hour. The saponified dyestuff of the formula:

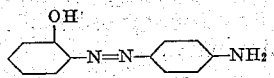

can be isolated by distilling the alcohol, suspending the residue in water, washing and drying. It is a yellow powder which dissolves in concentrated sulfuric acid to a brown-red solution. It dyes acetate silk yellow.

213 parts of the dyestuff thus obtained are heated with 102 parts of acetic anhydride for about ¼ hour to 100° C. The mass which solidifies on cooling is comminuted and washed with water and dried. The new dyestuff, which is a yellow powder, dissolves in concentrated sulfuric acid to a yellow-orange solution and dyes acetate silk fast green yellow. It corresponds very probably with the formula:

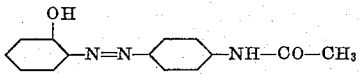

and is made according to the following equations:

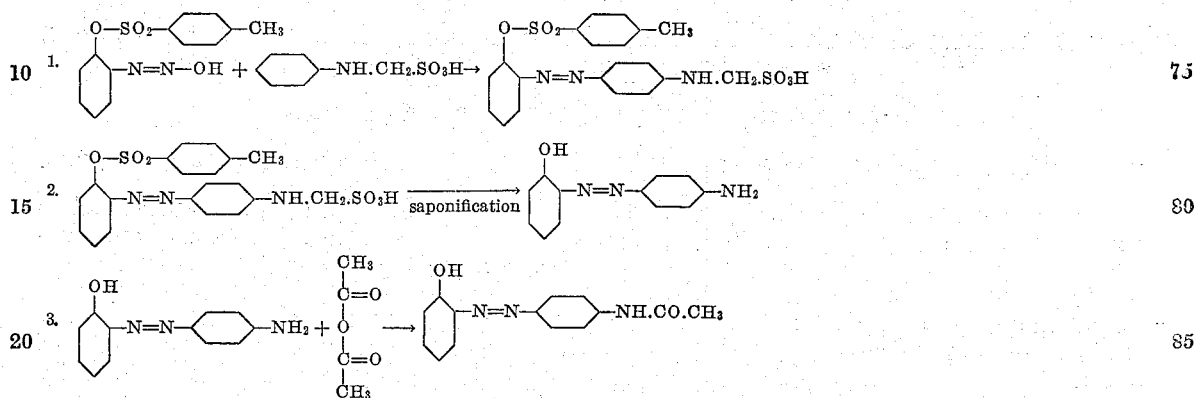

By alkylation of the saponified dyestuff of the first paragraph of this example with ethylchloride there may be obtained a product of the formula:

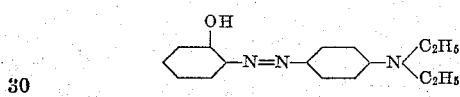

which dyes acetate silk orange tints which are fast to light and are not phototropic. This later product is also obtained by coupling the diazotized para-toluene-sulfonic acid ester of o-aminophenol with diethylaniline and saponification of the dyestuff.

Similar products are obtained when for the ω-methanesulfonic acid of aniline, that of ortho-toluidine or ortho-anisidine is substituted; or instead of these ω-methanesulfonic acids meta-toluidine, para-xylidine, para-cresidine, dimethylaniline or naphthylamine is used. So also, instead of ortho-aminophenol, substitution products thereof may be used, for instance 5-nitro-ortho-aminophenol, 4-methyl-ortho-aminophenol or 5-methyl-ortho-aminophenol and 4-chloro-ortho-aminophenol.

*Example 2*

263 parts of the para-toluenesulfonic acid ester of ortho-aminophenol are diazotized and introduced into a solution of 116 parts of sodium phenolate alkaline with sodium carbonate. The dyestuff of the formula:

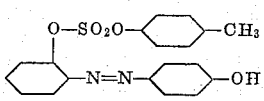

which is immediately formed is filtered and suspended in 1000 parts of alcohol; the suspension is mixed with 150 parts of caustic soda solution of 30 per cent. strength and the whole is boiled for a ¼ hour in a reflux apparatus. By distilling the alcohol, taking up the residue in water, filtering and washing, the saponified dyestuff of the formula:

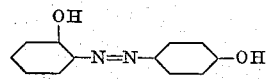

is obtained in the form of a yellow powder which dissolves in concentrated sulfuric acid to a brown red solution.

42 parts of the dyestuff thus obtained are dissolved in 20 parts of caustic soda solution of 30 per cent. strength and 200 parts of alcohol. The solution is mixed with 20 parts of ethyl chloride and the whole is heated in a closed vessel for 5 hours at 90–95° C. After cooling, the dyestuff which has separated is filtered and washed. It is a yellow powder, soluble in concentrated sulfuric acid to a yellow brown solution. It dyes acetate silk green-yellow. It corresponds very probably with the formula:

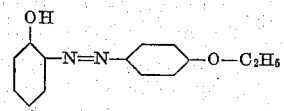

and is produced according to the following equations:

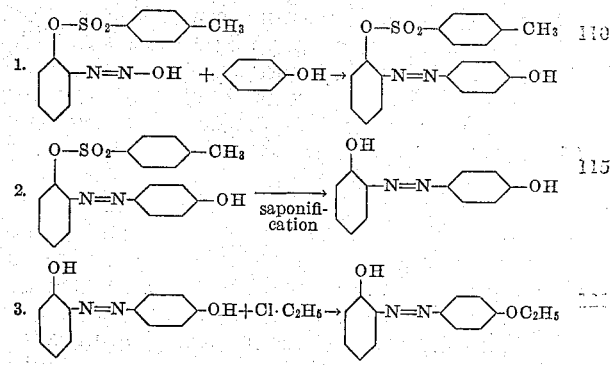

Similar products are obtained when there is substituted for the phenol another compound containing a hydroxyl-group, such as ortho-cresol, meta-cresol, meta-chlorophenol, or a naphthol; and when for the ortho-aminophenol there is substituted a substitution product thereof, such as the 5-nitro-ortho-aminophenol or 5-chloro-ortho-aminophenol, and the dyestuff is subsequently alkylated. As alkylating agent may be used, for instance, ethylbromide, dimethylsulfate, methylalcohol and sulfuric acid.

The procedure is similar when other coupling components are used. Varnishes and acetate silk are dyed, for example, yellow to orange and red tints by means of the unsaponified azo-dyestuffs from dimethyl- or diethyl-aniline, β-naphthol, 2:3- or 1:4-hydroxynaphthoic acid ester, β-naphthylamine, ethyl-β-naphthylamine or the like.

What I claim is:—

1. Process for the manufacture of azo-dyestuffs, consisting in coupling diazotized esters of nucleally not sulfonated ortho-amino-phenols with such nucleally not sulfonated aromatic compounds of the benzene series which contain an R—H residue, R being O or N—y, wherein y stands for the ω-methane sulfonic acid residue, treating the products thus obtained with caustic alkalies, and then replacing the hydrogen atom of the above mentioned R—H residue by an aliphatic residue containing at the most three carbon atoms.

2. Process for the manufacture of azo-dyestuffs, consisting in coupling diazotized esters of nucleally not sulfonated ortho-amino-phenols with such nucleally not sulfonated aromatic compounds of the benzene series which contain an R—H residue, R being O or N—y, wherein y stands for the ω-methane sulfonic acid residue, in paraposition to the place of coupling, treating the products thus obtained with caustic alkalies, and then replacing the hydrogen atom of the above mentioned R—H residue by an aliphatic residue containing at the most three carbon atoms.

3. Process for the manufacture of azo-dyestuffs, consisting in coupling diazotized esters of nucleally not sulfonated ortho-amino-phenols with such nucleally not sulfonated aromatic compounds of the benzene series which contain an NH—y group, y standing for the ω-methane sulfonic acid residue in para-position to the place of coupling, treating the products thus obtained with caustic alkalies, and then replacing at least one of the hydrogen atoms of the formed $NH_2$-group by an aliphatic residue containing at the most three carbon atoms.

4. Process for the manufacture of azo-dyestuffs, consisting in coupling diazotized esters of nucleally not sulfonated ortho-amino-phenols with such nucleally not sulfonated aromatic compounds of the benzene series which contain an NH—y group, y standing for the ω-methane sulfonic acid residue in para-position to the place of coupling, treating the products thus obtained with caustic alkalies, and then acidylating with acidylating agents deriving from such aliphatic carboxylic acids which contain not more than three carbon atoms.

5. Process for the manufacture of azo-dyestuffs, consisting in coupling diazotized esters of nucleally not sulfonated ortho-amino-phenols with such nucleally not sulfonated aromatic compounds of the benzene series which contain an NH—y group, y standing for the ω-methane sulfonic acid residue in para-position to the place of coupling, and then treating the products thus obtained successively with caustic alkalies, and with acetic anhydride.

6. Process for the manufacture of azo-dyestuffs, consisting in coupling diazotized esters of ortho-amino-phenol with ω-methane-sulfonic acids of compounds of the general formula:

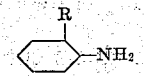

wherein R is alkyl or O-alkyl, and then treating the products thus obtained successively with caustic alkalies, and with acetic anhydride.

7. Process for the manufacture of an azo-dyestuff, consisting in coupling diazotized esters of ortho-amino-phenol with the ω-methanesulfonic acid of ortho-toluidine, and then treating the product thus obtained successively with caustic alkalies, and with acetic anhydride.

8. As new products the azo-dyestuffs of the general formula:

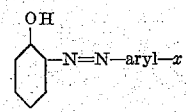

wherein the position standing in para-position to the OH-group is unsubstituted, aryl stands for a nucleus of the benzene series, and x is a nitrogen or oxygen atom which, on the one hand, is bound by one valency to the aryl nucleus, and, on the other hand, at least once to a group containing at most three carbon atoms, which products form yellow to red powders dissolving in organic solvents to yellow or orange solutions.

9. As new products the azo-dyestuffs of the general formula:

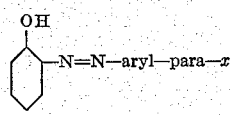

wherein the position standing in para-position to the OH-group is unsubstituted, aryl stands for a nucleus of the benzene series, and x is a nitrogen or oxygen atom which, on the one hand, is bound by one valency to the aryl nucleus, and, on the other hand, at least once to a group containing at most three carbon atoms, which products form yellow to red powders dissolving in organic solvents to yellow to orange solutions.

10. As new products the azo-dyestuffs of the general formula:

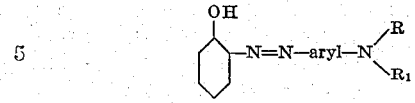

wherein the position standing in para-position to the OH-group is unsubstituted, aryl stands for a nucleus of the benzene series, R stands for H or an organic residue consisting of at most 3 carbon atoms, and $R_1$ for an organic residue consisting of at most 3 carbon atoms, which products form yellow to orange powders, dissolving in organic solvents to solutions of similar color, yielding on acetate silk yellow to orange not phototropic tints.

11. As new products the azo-dyestuffs of the general formula:

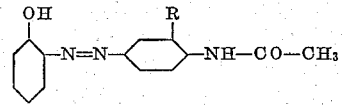

wherein the aryl residue originating from ortho-aminophenol is unsubstituted, and wherein R stands for alkyl or O-alkyl, which products form yellow powders, dissolving in organic solvents to yellow solutions, and, dyeing acetate silk yellow tints.

In witness whereof I have hereunto signed my name this 4th day of October, 1929.

FRIEDRICH FELIX.